United States Patent [19]
LaPointe

[11] 3,797,078
[45] Mar. 19, 1974

[54] LATCH AND V BAND COUPLER
[75] Inventor: Thomas A. LaPointe, Jerome, Mich.
[73] Assignee: Aeroquip Corporation, Jackson, Mich.
[22] Filed: Sept. 1, 1972
[21] Appl. No.: 285,640

[52] U.S. Cl.................................. 24/279, 285/367
[51] Int. Cl.......................... B65d 63/06, F16l 17/06
[58] Field of Search....... 285/2, 406, 407, 410, 411, 285/364–367; 24/279–286

[56] References Cited
UNITED STATES PATENTS

| | | | |
|---|---|---|---|
| 2,290,960 | 7/1942 | Hallerberg | 24/279 |
| 2,653,836 | 9/1953 | Christophersen et al. | 285/411 |
| 2,688,170 | 9/1954 | Balzer | 285/410 |
| 3,029,095 | 4/1962 | King et al. | 285/411 |
| 3,601,868 | 8/1971 | Elsner | 24/279 |
| 3,661,409 | 5/1972 | Brown et al. | 285/367 |

FOREIGN PATENTS OR APPLICATIONS
1,104,922 3/1968 Great Britain....................... 24/279

Primary Examiner—Donald A. Griffin
Attorney, Agent, or Firm—Harness, Dickey & Pierce

[57] ABSTRACT

A latch usable as a closing and/or opening mechanism and shown in conjunction with a coupler having segments drawn together to connect V band flanges. In a first embodiment, the latch comprises telescoping inverted U-shaped sections pivoted to the segments at their outer ends. One section carries a bolt which passes through the end of the other section so that tightening of a nut will create tension in the bolt as the sections are drawn together. Guide slots in each section receive a cross pin carried by the other section so that no bending loads are transmitted to the coupler. A safety feature is provided in the form of rupturable portions of one latch section, the cross pin which ruptures these portions remaining captive to prevent complete opening of the coupler. In a second embodiment, the latch sections are so constructed that the bolt is placed in compression instead of tension when the latch sections are drawn together.

19 Claims, 9 Drawing Figures

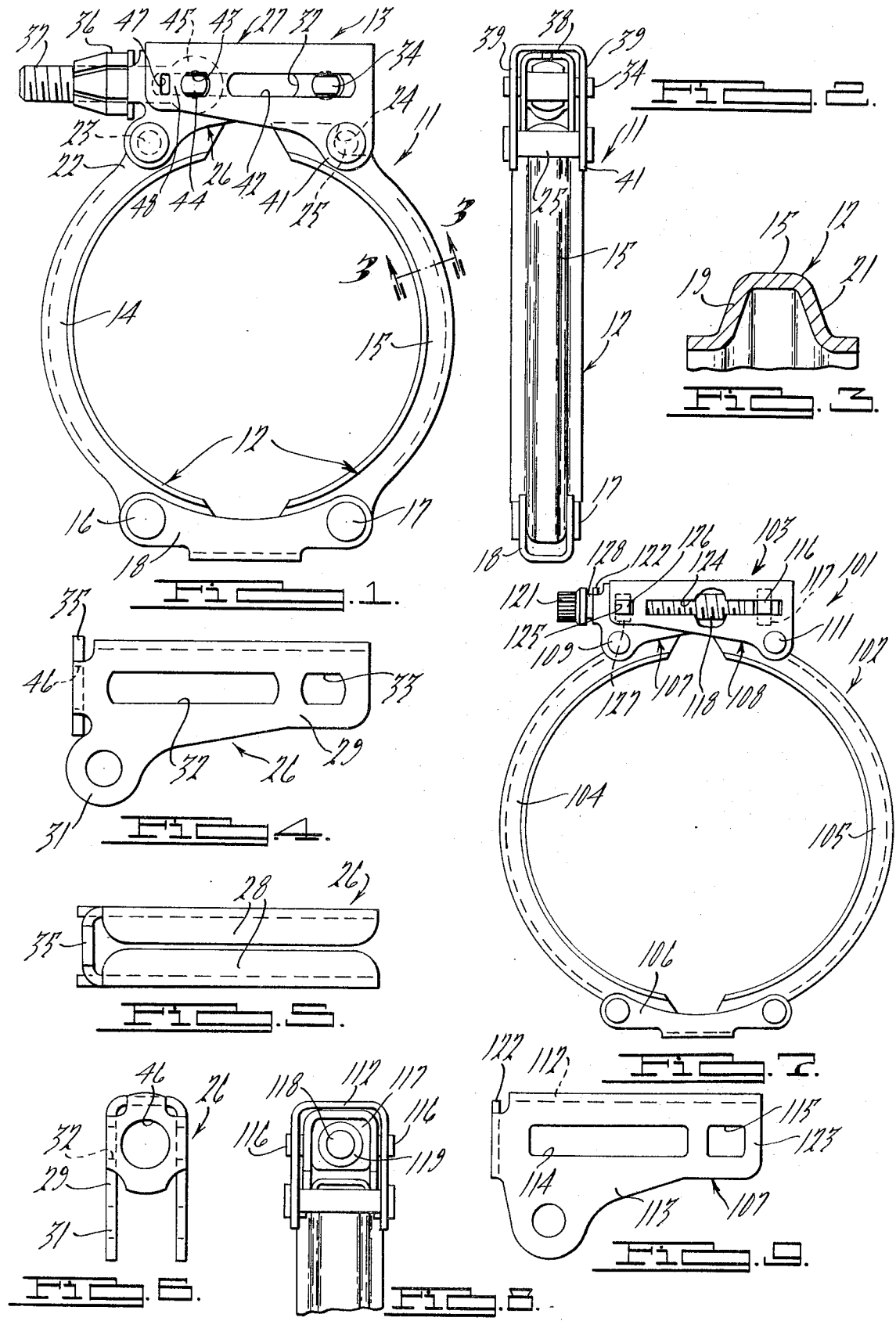

LATCH AND V BAND COUPLER

BACKGROUND OF THE INVENTION

The invention relates to latch mechanisms which may be used to close or open a mechanism such as a V band coupler. Such couplers comprise two semicircular segments with V-shaped cross-sections and pivoted to opposite ends of a bottom hinge. Drawing together the tops of the segments will cause the captive flanges to be drawn toward each other into tight sealing relation.

The latch mechanism of this invention is usuable with such couplers as well as in other environments as a closing and/or opening mechanism.

BRIEF SUMMARY OF THE INVENTION

Two basically similar embodiments of the latch mechanism are shown, one in which the bolt is in tension when the latch is being closed and the other where the bolt is in compression.

It is an object of the invention to provide a latch mechanism which can be used to draw parts together without applying forces to these parts other than those directly in line with the closing movement. Thus, undue strain on the parts is avoided and the parts may have their maximum possible strength-to-weight ratio.

It is a further object to provide a latch mechanism of this nature which allows a non-catastrophic failure mode. That is, when failure occurs the latch will expand until the load decreases to a level which will not cause further degradation of the latch. During and after failure, the latch will maintain a semi-closed position. In the illustrated embodiment, where the latch is used with a V band coupler having two segments, these segments will be held after failure so as to stop ducting or other clamped parts from complete separation and maintain a minimal leakage rate.

It is also an object to provide a latch mechansim of this type in which failure is visually indicated by the position of the bolt head or nut.

It is another object to provide an improved latch mechanism of this nature in which all components are captive and do not become loose when failure occurs.

The latch mechanism comprises two sections in telescoping relation, the sections having inverted U-shaped cross-sections. The outer ends of the sections have means for pivotally connecting them to a mechanism such as the segments of a V band coupler. Each section also has a pair of guide slots for cross pins which serve to maintain the straight-line movement of the telescoping sections.

A bolt is provided for drawing the sections together. In a first embodiment, the bolt is fixed to the inner end of one section by the cross pin and extends through the outer end of the other section. A nut on the bolt, when tightened, will create tension in the bolt and draw the sections together. Rupturable portions on one latch section will fail when an overload is supplied to the bolt. When this occurs, the cross pin will be held captive by another portion of the ruptured section so that opening movement of the latch sections will be limited. Failure will be indicated by the nut moving away from the adjacent latch section end.

In the second embodiment, the latch sections overlap sufficiently to permit one cross pin to be rotatably mounted on the end of the bolt with a nut mounted on an intermediate portion and carrying the other cross pin. Rotation of the bolt will draw the latch sections together in a manner such that compression will be created in the bolt between the locations of the two cross pins. This embodiment has the additional advantage of providing maximum coupling travel for ease of installation, for example, over V band flanges, while maintaining the smallest possible closed envelope.

BRIEF DESCRIPTION OF THE DRAWINGS

FIG. 1 is a side elevational view of a first embodiment of the latch mechanism of this invention combined with a V band coupler, this embodiment being so constructed that the bolt is placed in tension when the latch mechanism is being tightened.

FIG. 2 is an end elevational view of the assembly of FIG. 1.

FIG. 3 is a detailed cross-sectional view taken along the line 3—3 of FIG. 1 and showing the construction of the coupler segments.

FIG. 4 is a side elevational view of the inner latch section.

FIG. 5 is a top plan view of this section.

FIG. 6 is an end elevational view of the inner latch section.

FIG. 7 is a side elevational view of a second embodiment of the invention in which the latch bolt is placed in compression during tightening.

FIG. 8 is a fragmentary end elevational view of this embodiment.

FIG. 9 is a side elevational view of the inner latch section.

DESCRIPTION OF THE PREFERRED EMBODIMENTS

Referring first to the embodiment of FIGS. 1 to 6, the assembly of the latch and coupler is generally indicated at 11 and comprises a V band coupler generally indicated at 12 and a latch mechanism generally indicated at 13. The V band coupler is of basically conventional construction, having a pair of segments 14 and 15 of arcuate shape pivoted at 16 and 17 respectively to a hinge 18 at their lower ends. The segments are adapted to engage abutting flanges of a pair of conduits (not shown) and draw them together into tight sealing relation. For this purpose, the cross-sectional shape of each segment is shown in FIG. 3, having a pair of flared side walls 19 and 21 extending from the central portion.

The upper end of segment 14 has a raised apertured portion 22 for a pivot 23 which holds one side of latch 13. A notch 24 is formed in the upper end of segment 15 for the reception of a pin 25 carried at the other end of latch 13. Pin 25 is removable from notch 24 so that the coupler may be opened when placing it around or removing it from the conduit flanges.

Latch 13 comprises an inner section generally indicated at 26 and an outer section generally indicated at 27 in telescoping relation and connected to segments 14 and 15 respectively. Each latch section is of generally inverted U-shaped cross-sectional shape, as seen with respect to latch section 26 in FIG. 6. The latch sections are preferably fabricated as stampings which are bent into position. Inner latch section 26 has a split web portion 28 and a pair of downwardly extending flange portions 29. Ears 31 extend from the lower outer portions of flanges 29 and overlap portion 22 of segment 14, being secured thereto by pivot pin 23. (To simplify the description, the ends of section 26 and 27, connected to the segments, are referred to as the "outer" ends or portions and the opposite ends as the "inner" portions.) Flanges 29 have elongated guide slots 32 for a cross pin as will later appear, and the inner ends of flanges have cross pin retaining apertures 33. A cross pin 34 is fixed in apertures 33, having flat upper and lower surfaces held by guide slots in outer latch section 27 as described below. The end 35 of latch section 26 is flat so as to be engageable by a nut 36 threaded on a bolt 37 carried by outer latch section 27.

Section 27 has an upper web portion 38 sliding on web 28 of section 26, and a pair of downwardly extending flanges 39. The outer ends of these flanges have ears 41 carrying pin 25 which is receivable by notch 24. A pair of guide slots 42 in flanges 39 receive cross pin 34 of latch section 26. A pair of apertured portions 43 inwardly of slots 42 receive a cross pin 44 which is secured to the head 45 of bolt 37, the latter extending through an apertured portion 46 of end 35 on latch section 26. Cross pin 44, like cross pin 34, has flattened upper and lower surfaces and extends through guide slots 32 of latch section 26.

Means are provided for retaining the coupler in a semi-closed position during and after failure of the latch. This means comprises a pair of apertured portions 47 inwardly of but adjacent apertures 43. These create zones 48 between the apertures which will rupture upon excessive closing load being applied to the latch mechansim for any reason. Should this occur, cross pin 44 will be held captive within apertured portions 47 so that the opening movement of the coupler segments will be limited and the ducting or other clamped parts will not become completely separated.

In operation of the embodiment of FIGS. 1 to 6, segments 14 and 15 of coupler 12 will be placed around the flanges to be coupled and pin 25 placed in notch 24 of coupler segment 15. Nut 36 will then be tightened on bolt 27 against end 35 of latch section 26. This will force latch section 26 to the right and draw latch section 27 to the left in FIG. 1. During this movement, cross pin 34 carried by latch section 26 will slide in guide slots 42 of latch section 27, while cross pin 44 carried by the latter section will be guided by slots 32 of section 26. The portion of bolt 37 between head 45 and nut 36 will thus be in tension.

Because of the articulated nature of the latch mechanism and the presence of the cross pins and guide slots, the forces exerted by pins 23 and 25 on the upper ends of coupler segments 14 and 15 respectively will be parallel to the extent of bolt 37. The internal latch components will thus absorb all bending loads attributed to closing of the coupler with no such loads being imposed on the coupler segments. This will minimize the load carrying requirements of the coupler segments, allowing the maximum possible strength-to-weight ratio for the segments. Should a failure of the latch mechanism occur, as above described, the rupturing of portions 48 of latch section 27 will permit cross pin 44 to move outwardly until it engages the outer ends of apertured portions 47. This will limit the opening movement of the coupler segments. Failure will be visually indicated by the positon of nut 36 which will move away from end 35 of latch section 26. All components of the latch mechanism are self-restrained and will not become loose when failure occurs.

FIGS. 7, 8 and 9 show a second embodiment of the invention which is basically similar to the previous embodiment but in which the bolt is placed in compression during tightening. The assembly is generally indicated at 101 and comprises a coupler generally indicated at 102 and a latch mechanism generally indicated at 103. Coupler 102 comprises segments 104 and 105 with a hinge 106 connecting their lower ends. Latch mechanism 103 comprises an inner latch section generally indicated at 107 and an outer latch section generally indicated at 108. Section 107 is fixedly pivoted at 109 to segment 104 while section 108 has a removable pivotal connection 111 to segment 105.

Latch sections 107 and 108 are of inverted U-shaped cross-section. Section 107 is best seen in FIG. 9 and has a web portion 112, a pair of side flanges 113, a pair of guide slots 114 and a pair of apertured portions 115 at its inner end which retain a cross pin 116. This cross pin is in the form of projections from a collar 117 rotatably mounted at the end of a bolt 118 by means of a staked washer 119. Bolt 118 extends through inner latch section 107, its head 121 being spaced outwardly from the end 122 of this section.

The zone 123 of flanges 113 between apertures 115 and the inner end of latch section 107 are rupturable and act as a safety feature, as described below.

Outer latch section 108 partially surrounds section 107, its flanges having guide slots 124 within which cross pin 116 is disposed. A pair of apertured portions 125 are provided in the flanges of latch section 108 inwardly of slots 124, these apertures retaining a cross pin 126 carried by a nut 127 on bolt 118.

In operation of the embodiment of FIGS. 7 to 9, tightening of latch mechanism 103 will be accomplished by rotating bolt 118 to drive nut 127 toward head 121 and collar 117 in the opposite direction. Cross pin 116 will press against the inner or right hand ends of apertures 115 while cross pin 126 presses against the inner or left hand ends of apertures 125. This will draw the upper ends of coupler 102 toward each other and place bolt 118 in compression. Portion 128 of bolt shank 118 will be exposed between head 121 and end 122 of latch section 107. As in the previous embodiment, the cross pins and guide slots will insure that only forces parallel to the bolt axis will be exerted on segments 104 and 105.

Should the latch mechansim fail by rupture of portions 123 of section 107, cross pin 116 will be held captive by the outer or right hand ends of slots 124. Thus, as in the previous embodiment, the components will not become loose when failure occurs. Head 121 of the bolt will seat against end 122 of section 107 to indicate visually failure of the latch, but the semi-closed position of the coupler will stop ducting or clamped parts from complete separation. The latch construction of this embodiment provides maximum opening travel for ease of installation over duct flanges while maintaining the smallest possible closed envelope.

I claim:

1. In a latch mechanism, inner and outer telescoping latch sections, each section having a cross-section of inverted U-shape with a web and downwardly extending flanges, pivots carried by said flanges for connection to a pair of members to be drawn together, said latch sections extending from said pivots in opposite directions, a bolt extending through the inner latch section, first and second cross pins, said first cross pin extending through apertured portions of said outer latch section and guide slots in said inner latch section parallel to said bolt, said second cross pin extending through apertured portions in said inner latch section and guide slots in the outer latch section parallel to said bolt, a nut on said bolt, and means for causing relative rotation between the nut and bolt whereby the nut will advance axially with respect to the bolt, said nut being connected to one latch section and one end of said bolt being connected by one of said cross pins to said other latch section, whereby said axial advance will cause relative movement of said pivots parallel to the bolt axis.

2. The combination according to claim 1, said one end of the bolt comprising its head, the bolt extending through an end of said inner latch section, said nut being mounted on the bolt outwardly of said inner latch section and engageable with said end.

3. The combination according to claim 2, said cross pin carried by the bolt head being in retaining apertures of said outer latch section, and additional apertured portions in the flanges of said outer latch section outwardly of the apertures retaining said cross pin, the material between said first and second pairs of apertures being rupturable in response to overloading of said bolt, whereby opening of the latch mechanism upon failure will be limited.

4. The combination according to claim 1, said one end of the bolt being the end remote from its head, the head of said bolt being disposed outwardly of said latch sections, said nut carrying the second cross pin, whereby tightening of said latch will cause compression in that portion of the bolt between the cross pins.

5. The combination according to claim 1, said cross pins having flat surfaces engaging the edges of said guide slots.

6. The combination according to claim 1, the flanges of one of said latch sections having rupturable portions adjacent its cross pin apertures, whereby the cross pin will remain captive in its guide slots after said portions have been ruptured.

7. The combination according to claim 6, said nut being normally outside said latch sections and engageable with the end of the inner latch section, the direction of tightening forces being such that upon failure of said rupturable flange portions the nut will be spaced from said latch section as a visual indication of latch failure.

8. The combination according to claim 6, the head of said bolt being outside said latch sections and normally spaced from the end of the inner latch section, the direction of tightening forces being such that upon failure of said rupturable flange portions the bolt head will move into engagement with said inner latch section end.

9. In combination, a V band coupler having arcuate segments with their lower ends connected by a hinge, and a latch mechanism for drawing together the upper ends of said segments, said latch mechanism comprising telescoping inner and outer latch sections, said sections being of inverted U-shaped cross-section, each section having a web and downwardly extending flanges, pivotal connections between the lower ends of said flanges and the upper ends of said coupler segments, a cross pin carried by each section and slidable in guide slots formed in the flanges of the other section, a bolt carried within said latch sections, one end of said bolt being connected to one latch section, and a nut connecting said bolt to the other latch section, whereby relative rotation of said nut and bolt will draw said latch sections together, said cross pins constraining movement of said pivotal connections to a direction parallel to the bolt axis.

10. The combination according to claim 9, the flanges of one of said latch sections being further provided with rupturable portions adjacent the cross pin which it carries, the rupturable portions being so located that the cross pin rupturing said portions will be permitted only limited movement to prevent said coupler from complete opening.

11. The combination according to claim 10, said cross pins having flat surfaces engaging the edges of said guide slots.

12. The combination according to claim 10, one of said cross pins being secured to the head of said bolt within said inner latch section, the bolt extending outwardly through the end of said latch section, said nut being mounted on said bolt outwardly of said latch sections and normally engageable with said end, failure of said rupturable portions causing said nut to be spaced from said end, whereby the failure will be visually indicated.

13. The combination according to claim 9, the head of said bolt being spaced outwardly from an end portion of said inner latch section, the other end of said bolt having one of said cross pins rotatably mounted thereon, the other cross pin being carried by said nut.

14. The combination according to claim 13, the length of said bolt being such that said head is normally spaced from said end of the inner latch section but is movable against said end in response to failure of said rupturable portions, whereby failure of the latch will be visually indicated.

15. The combination according to claim 9, one of said pivotal connections being removably mounted in a notch formed in the corresponding coupler.

16. The combination according to claim 9, the arrangement of parts being such that a portion of said bolt between the end carrying the cross pin and said nut will be in tension when the coupler is being tightened.

17. The combination according to claim 9, the arrangement of parts being such that a portion of said bolt between the end carrying the cross pin and said nut will be in compression when the coupler is being tightened.

18. The combination according to claim 9, further provided with means for limiting the opening movement of said latch mechanism and coupler in response to failure of a portion of one of the latch sections, and means for visually indicating such failure.

19. A latch mechanism for drawing together two parts, said latch mechanism comprising telescoping inner and outer latch sections, said sections being of inverted U-shaped cross-section, each section having a web and downwardly extending flanges, pivotal connections between the lower ends of said flanges and said parts, a cross pin carried by each section and slidable in guide slots formed in the flanges of the other section, a bolt carried within said latch sections, one end of said bolt being connected to one latch section, and a nut connecting said bolt to the other latch section, whereby relative rotation of said nut and bolt will draw said latch sections together, said cross pins constraining movement of said pivotal connections to a direction parallel to the bolt axis.

* * * * *